(12) United States Patent
Papon et al.

(10) Patent No.: US 11,747,890 B2
(45) Date of Patent: Sep. 5, 2023

(54) AUGMENTED REALITY ENHANCED INTERACTIVE ROBOTIC ANIMATION

(71) Applicant: Disney Enterprises, Inc., Burbank, CA (US)

(72) Inventors: Jeremie A. Papon, Los Angeles, CA (US); Michael Anthony Hopkins, North Chesterfield, VA (US); Kyle Michael Cesare, Burbank, CA (US); Georg Wiedebach, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/517,589

(22) Filed: Nov. 2, 2021

(65) Prior Publication Data

US 2023/0136159 A1 May 4, 2023

(51) Int. Cl.
| | | |
|---|---|---|
| *G06F 3/01* | (2006.01) | |
| *G06T 13/40* | (2011.01) | |
| *B25J 9/00* | (2006.01) | |
| *B25J 11/00* | (2006.01) | |
| *G02B 27/01* | (2006.01) | |
| *G06T 19/00* | (2011.01) | |
| *G06N 20/00* | (2019.01) | |

(52) U.S. Cl.
CPC ............. *G06F 3/011* (2013.01); *B25J 9/0081* (2013.01); *B25J 11/0005* (2013.01); *G02B 27/017* (2013.01); *G02B 27/0179* (2013.01); *G06N 20/00* (2019.01); *G06T 13/40* (2013.01); *G06T 19/006* (2013.01); *G02B 2027/0178* (2013.01); *G02B 2027/0187* (2013.01)

(58) Field of Classification Search
CPC ........ G06F 3/011; G06N 20/00; B25J 9/0081; B25J 11/0005; G02B 27/017; G02B 27/0179; G02B 2027/0178; G02B 2027/0187; G06T 13/40; G06T 19/006
See application file for complete search history.

(56) References Cited

U.S. PATENT DOCUMENTS

| | | | |
|---|---|---|---|
| 11,024,098 B1 | 6/2021 | Drake et al. | |
| 11,398,461 B2* | 7/2022 | Shin | G02B 27/4205 |
| 11,407,109 B2* | 8/2022 | Paolini | B25J 9/1664 |
| 2013/0293468 A1* | 11/2013 | Perez | G06F 3/033 |
| | | | 345/158 |
| 2019/0197785 A1* | 6/2019 | Tate-Gans | G06T 19/006 |

(Continued)

*Primary Examiner* — Doon Y Chow
(74) *Attorney, Agent, or Firm* — Farjami & Farjami LLP

(57) ABSTRACT

A system includes a computing platform having processing hardware, one or more sensor(s), and a memory storing perception software and animation software, as well as an augmented reality (AR) headset including another processing hardware. The computing platform is configured to obtain an environmental data using the sensor(s), determine the location and orientation of the AR headset using the perception software and the environmental data, identify an action for execution by the computing platform, using the animation software and the location and orientation of the AR headset, and transmit performative data corresponding to the identified action to the AR headset. The AR headset is configured to receive, from the computing platform, the performative data, and to render at least one AR effect corresponding to the identified action using the performative data.

19 Claims, 8 Drawing Sheets

(56) References Cited

U.S. PATENT DOCUMENTS

2020/0369333 A1    11/2020  Lavalley et al.
2021/0125414 A1*    4/2021  Berkebile ............... G06T 17/20
2021/0346093 A1*   11/2021  Redmond .............. A61B 34/25

* cited by examiner

AUGMENTED REALITY ENHANCED INTERACTIVE ROBOTIC ANIMATION

BACKGROUND

Animating and testing lifelike interactive robotic characters is a challenging problem at least in part because it involves a feedback loop between the human and robot actions. That is to say, both the human and the robot are continuously reacting to each other. Because of this feedback loop, standard animation tools do not give a true-to-life view of what the animated character will ultimately look like.

One possible solution to this problem is to provide a simulator and procedural animation system with live recorded human inputs from a sensor, such as a webcam, for example, but this still does not fully close the feedback loop, since the input sensors are not moving as they would on the physical hardware. Consider, for instance, a camera placed in a robot's head: as the robot moves, what the camera sees is influenced by the movement itself. As a result, for example, when a robot glances at a person, the animation of the glance itself will influence the performance of the system as whole. Consequently, there is a need in the art for a simulation solution that integrates the human and robotic perspectives of a mutual interaction.

DETAILED DESCRIPTION

Figure 1:
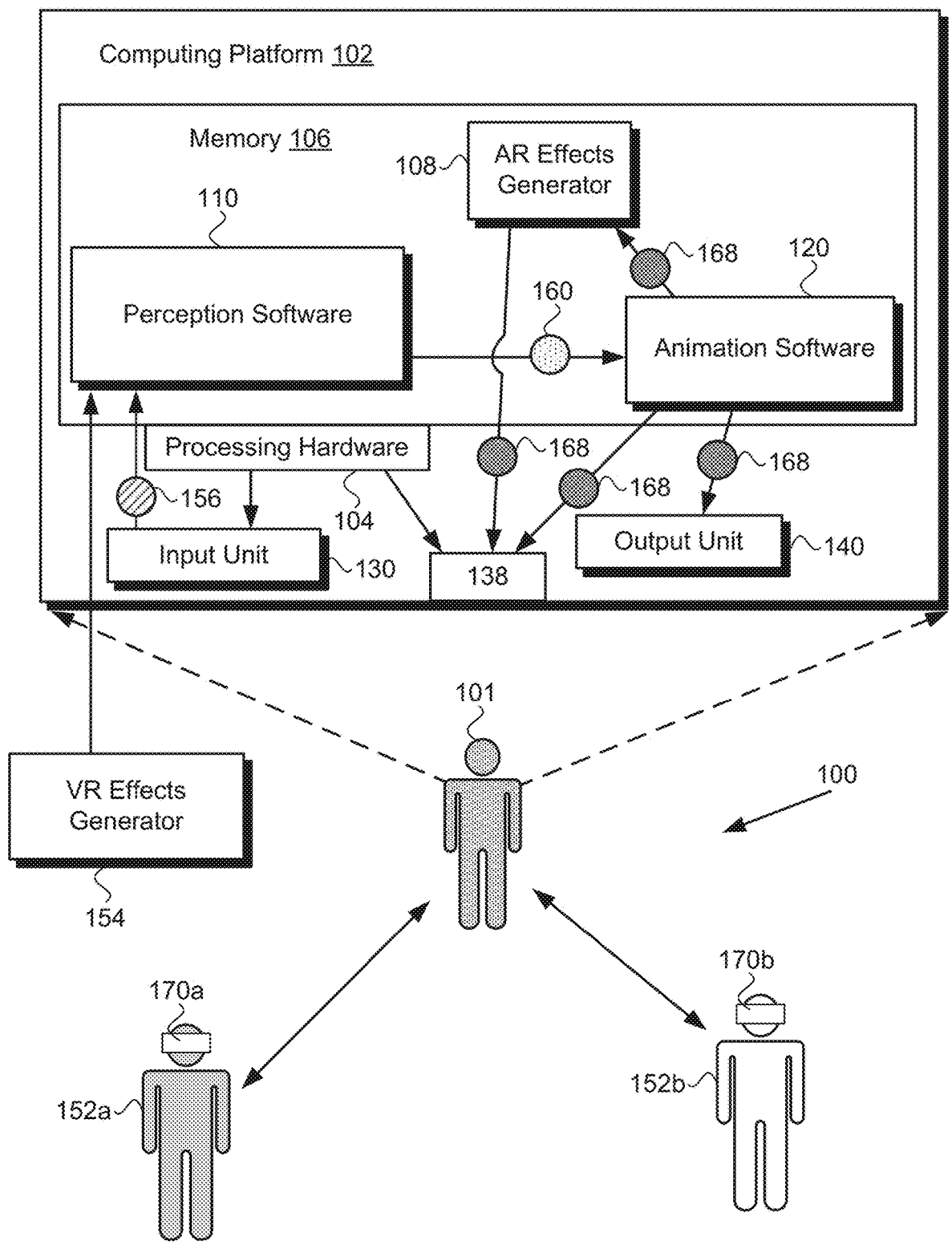
FIG. 1 shows an exemplary system for providing augmented reality (AR) enhanced interactive robotic animation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing augmented reality (AR) enhanced interactive robotic animation. It is noted that, as defined in the present application, the term "interactive" or "interaction" may refer to language based communications in the form of speech or text, for example, and in some implementations may include non-verbal expressions. Moreover, the term "n-verbal expression" may refer to vocalizations that are not language based, i.e., non-verbal vocalizations, as well as to physical gestures, postures, and facial expressions. Examples of non-verbal vocalizations may include a sigh, a murmur of agreement or disagreement, or a giggle, to name a few. It is further noted that the AR enhanced interactive robotic animation solution disclosed in the present application may be implemented as automated systems and methods.

It is noted that, as used in the present application, the terms "automation," "automated," and "automating" refer to systems and processes that do not require the participation of a human administrator. Although in some implementations the interactive robotic animations produced by the systems and methods disclosed herein may be reviewed or even modified by a human designer or system administrator, that human involvement is optional. Thus, the methods described in the present application may be performed under the control of hardware processing components of the disclosed systems.

FIG. 1 shows exemplary system 100 for providing augmented reality (AR) enhanced interactive robotic animation, according to one implementation. System 100 includes computing platform 102 having processing hardware 104, input unit 130, output unit 140, transceiver 138, and memory 106 implemented as a computer-readable non-transitory storage medium. According to the present exemplary implementation, memory 106 stores perception software 110, animation software 120, and, optionally, AR effects generator 108. In addition, in some implementations, system 100 may further include one or more AR headsets 170a and 170b, virtual reality (VR) effects generator 154, or VR effects generator 154 and one or more AR headsets 170a and 170b.

In some implementations, computing platform 102 may be included in automaton 101. It is noted that automaton 101 may take a variety of different forms. For example, as depicted in FIG. 1, automaton 101 may be implemented as a humanoid robot or toy. However, in other implementations, automaton 101 may take the form of a non-humanoid robot or toy. In still other implementations, automaton 101 may be a self-propelled vehicle, such as a self-driving car or self-guided theme park ride vehicle, for example. In addition, FIG. 1 shows one or more human users 152a and 152b utilizing respective AR headsets 170a and 170b to observe one or more actions executed by computing platform 102 using automaton 101. Also shown in FIG. 1 are environmental data 156, AR headset location and orientation data 160, and performative data 168.

It is noted that although FIG. 1 depicts two human user 152a and 152b utilizing two AR headsets 170a and 170b, that representation is merely exemplary. In other implementations, system 100 may include one AR headset for use by a single human user, more than two AR headsets for use by more than two human users, or may include VR effects generator 154 but omit AR headsets 170a and 170b.

Although the present application refers to perception software 110, animation software 120, and optional AR effects generator 108 as being stored in memory 106 for conceptual clarity, more generally, memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as perception software 110 and animation software 120, from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

As defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data.

Transceiver 138 of system 100 may be implemented as any suitable wireless communication unit. For example, transceiver 138 may be implemented as a fourth generation (4G) wireless transceiver, or as a 5G wireless transceiver. In addition, or alternatively, transceiver 138 may be configured for communications using one or more of WiFi, Bluetooth, ZigBee, and 60 GHz wireless communications methods.

Figure 2A:
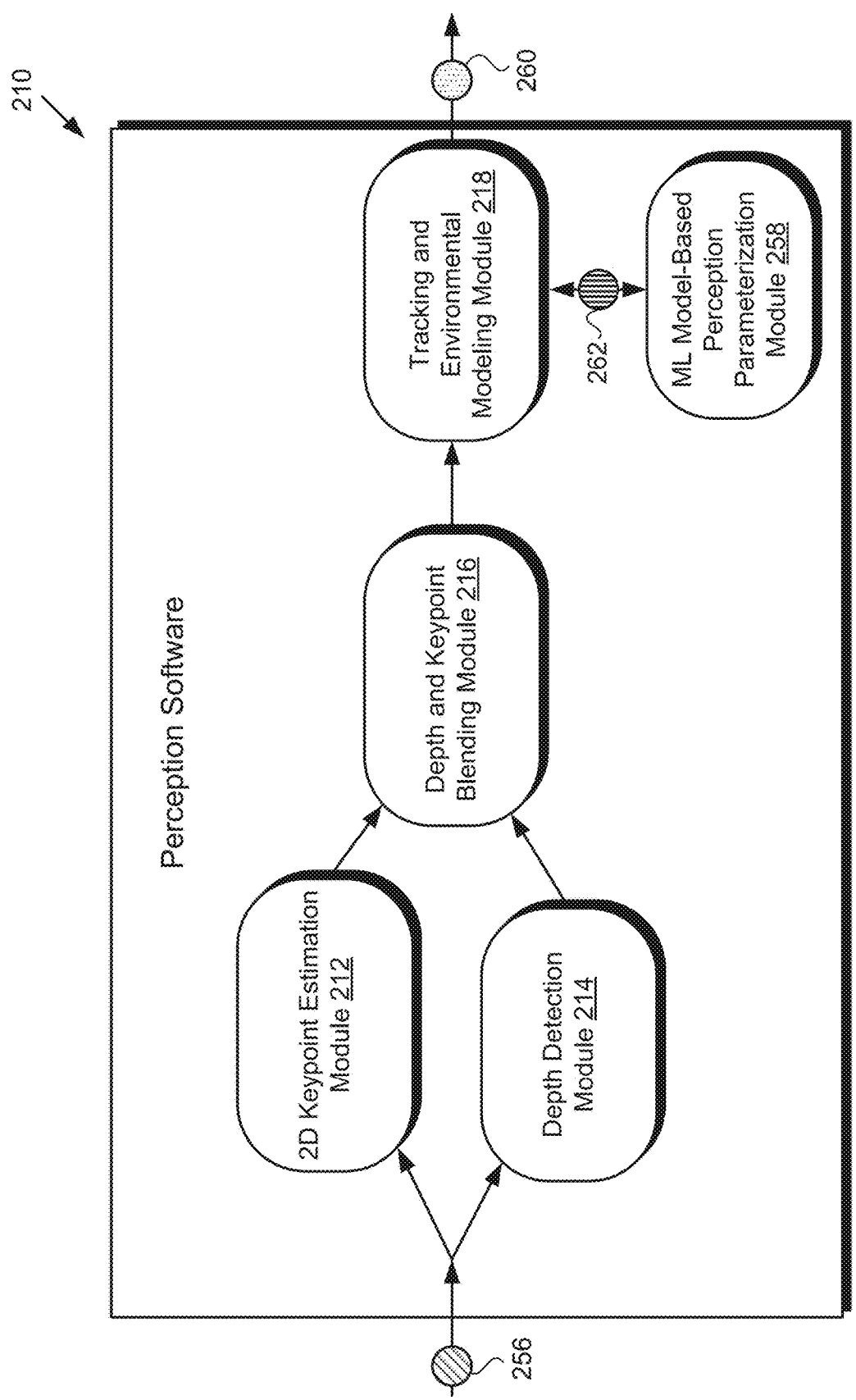
FIG. 2A shows a more detailed diagram of perception software suitable for use by the system shown in FIG. 1, according to one implementation.

FIG. 2A shows a more detailed diagram of perception software 210 suitable for use by system 100 in FIG. 1, according to one implementation. As shown in FIG. 2A, perception software 210 includes two-dimensional (2D) keypoint estimation module 212, depth detection module 214, depth and keypoint blending module 216, tracking and environmental modeling module 218, and may further include optional ML model-based perception parameterization module 258. As further shown in FIG. 2A, perception software 210 is configured to receive environmental data 256 as an input and to provide AR headset location and orientation data 260 as an output. Also shown in FIG. 2A are one or more programming parameters 262 (hereinafter "programming parameter(s) 262") of perception software 210, which may be provided as an output or outputs of ML model-based perception parameterization module 258.

It is noted that, as defined for the purposes of the present application, the feature "environmental data" refers to data describing objects and conditions in the vicinity of system 100, such as within a specified radius of computing platform 102, or within a room or other venue occupied by computing platform 102, for instance. Specific examples of environmental data may include a visual image or images captured by a camera, audio captured by one or more microphones, temperature, weather, or lighting conditions, radar or lidar data, or any data obtained using sensors included in input unit 130, as described in greater detail below by reference to FIG. 2C.

With respect to the expressions "2D keypoint" or "2D keypoints," it is further noted that 2D keypoints are defined to be predetermined locations of a human skeleton, such as joint positions for example, that may be used to estimate the pose and movement of a human being interacting with or merely present in the vicinity of system 100. Moreover, the feature(s) "programming parameter(s) 262" refer to variables that govern how system 100 processes environmental data 256 so as to "perceive" the world. For instance programming parameter(s) 262 may include the respective weights applied to different types of data included in environmental data 256 when interpreting environmental data 256. As a specific example, programming parameter(s) 262 may specify that audio data included in environmental data 256 be less heavily weighted than image or depth data included in environmental data 256 when determining AR headset location and orientation data 260, but that the audio data be more heavily weighted than lighting or temperature data when making that determination.

Environmental data 256 and AR headset location and orientation data 260 correspond respectively in general to environmental data 156 and AR headset location and orientation data 160, in FIG. 1. Consequently, environmental data 156 and AR headset location and orientation data 160 may share any of the characteristics attributed to respective environmental data 256 and AR headset location and orientation data 260 by the present disclosure, and vice versa.

In addition, perception software 210, in FIG. 2A, corresponds in general to perception software 110, in FIG. 1, and those corresponding features may share any of the characteristics attributed to either feature by the present disclosure. Thus, although not shown in FIG. 1, like perception software 210, perception software 110 may include features corresponding respectively to 2D keypoint estimation module 212, depth detection module 214, depth and keypoint blending module 216, tracking and environmental modeling module 218, and optional ML model-based perception parameterization module 258.

It is noted that the specific features shown by FIG. 2A to be included in perception software 110/210 are merely exemplary, and in other implementations, perception software 110/210 may include more, or fewer, features than 2D keypoint estimation module 212, depth detection module 214, depth and keypoint blending module 216, tracking and environmental modeling module 218, and optional ML model-based perception parameterization module 258.

Figure 2B:
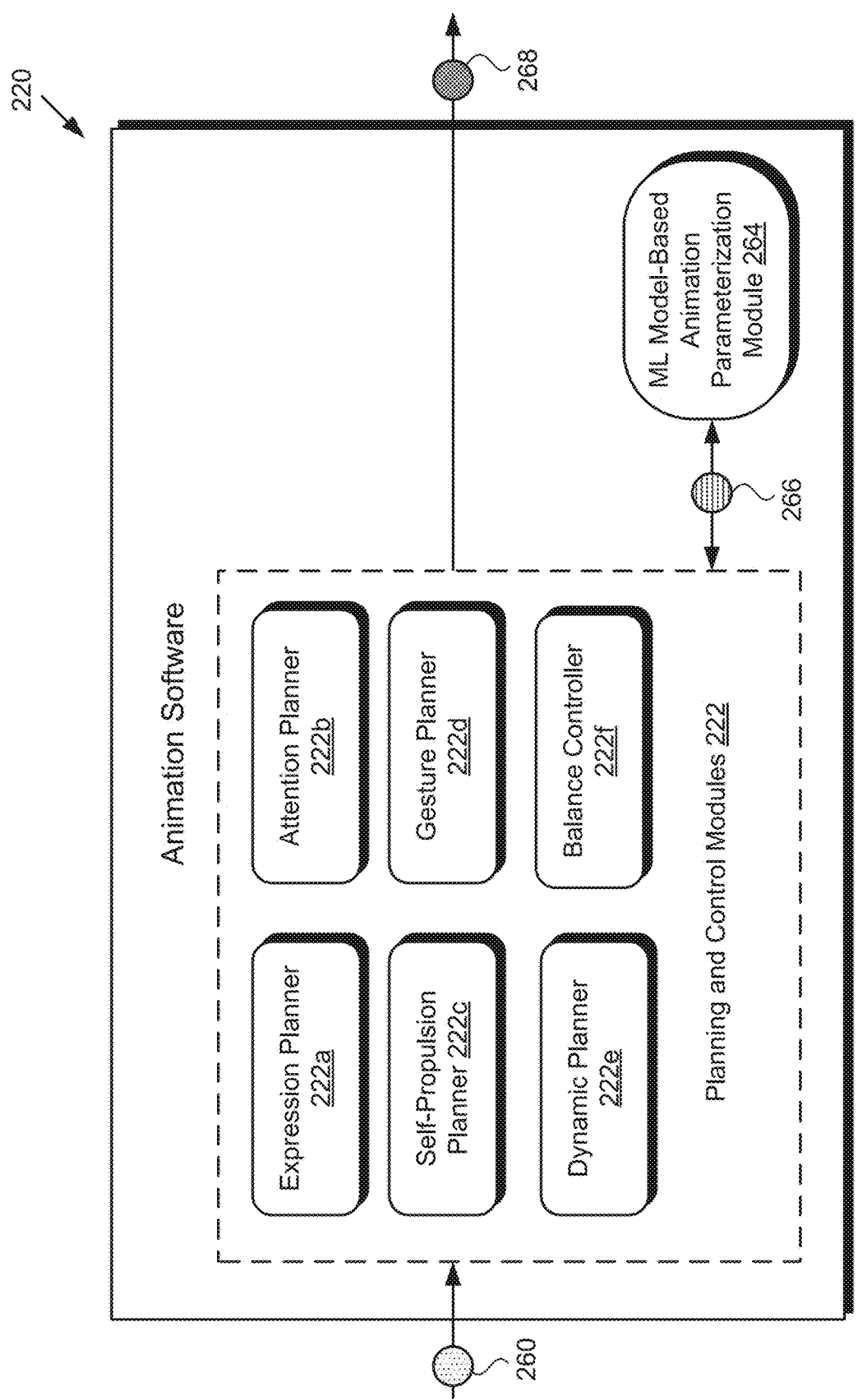
FIG. 2B shows a more detailed diagram of animation software suitable for use by the system shown in FIG. 1, according to one implementation.

FIG. 2B shows a more detailed diagram of animation software 220 suitable for use by system 100 in FIG. 1, according to one implementation. As shown in FIG. 2B, animation software 220 may include multiple planning and control modules 222 including expression planner 222a, attention planner 222b, self-propulsion planner 222c, gesture planner 222d, dynamic planner 222e, and balance controller 222f. In addition, in some implementations, animation software 220 may include optional ML model-based animation parameterization module 264. As further shown in FIG. 2B, animation software 220 is configured to receive AR headset location and orientation data 260 as an input and to provide performative data 268 as an output. Also shown in FIG. 2B are one or more programming parameters 266 (hereinafter "programming parameter(s) 266") for animation software 220.

It is noted that, as defined for the purposes of the present application, the feature "performative data" refers to instructions for executing an action using computing platform 102, in FIG. 1. Such an action may take a variety of forms, and may include speech, a non-verbal utterance, a glance, an eye movement or other facial expression, a posture, or a partial or whole body movement. By way of example, in implementations in which computing platform 102 is included in automaton 101 having joints, performative data 268 may include instructions for articulating one or more of those joints. Alternatively, in implementations in which computing platform 102 is included in automaton 101 in the form of a self-propelled vehicle, performative data 268 include instructions for accelerating, slowing, turning, or stopping the self-propelled vehicle. In addition to instructions for executing an action, in some implementations, as discussed below by reference to FIG. 4, performative data 268 may describe or include one or more AR effects corresponding to the action to be executed by computing platform 102.

It is further noted that the feature(s) "programming parameter(s) 266" refer to variables that govern how system 100 responds to environmental data 256 so as to interact with the world. For instance programming parameter(s) 266 may include the respective weights applied to different modes of expression, such as variable weights that may be applied to gaze intensity, blink rate, or the speed with which head or body motions are executed may be specified by programming parameter(s) 266.

As noted above by reference to FIG. 2A, AR headset location and orientation data 260 corresponds in general to AR headset location and orientation data 160, in FIG. 1. In addition, performative data 268, in FIG. 2B, corresponds in general to performative data 168, in FIG. 1. That is to say performative data 168 may share any of the characteristics attributed to performative data 268 by the present disclosure, and vice versa.

Moreover, animation software 220, in FIG. 2B, corresponds in general to animation software 120, in FIG. 1, and those corresponding features may share any of the characteristics attributed to either feature by the present disclosure. Thus, although not shown in FIG. 1, like animation software 220, animation software 120 may include features corresponding respectively to planning and control modules 222 including expression planner 222a, attention planner 222b, self-propulsion planner 222c, gesture planner 222d, dynamic planner 222e, and balance controller 222f, as well as optional ML model-based animation parameterization module 264.

It is noted that the specific features shown by FIG. 2B to be included in animation software 120/220 are merely exemplary, and in other implementations, animation software 120/220 may include more, or fewer, features than optional ML model-based animation parameterization module 264 and planning and control modules 222 including expression planner 222a, attention planner 222b, self-propulsion planner 222c, gesture planner 222d, dynamic planner 222e, and balance controller 222f.

Figure 2C:
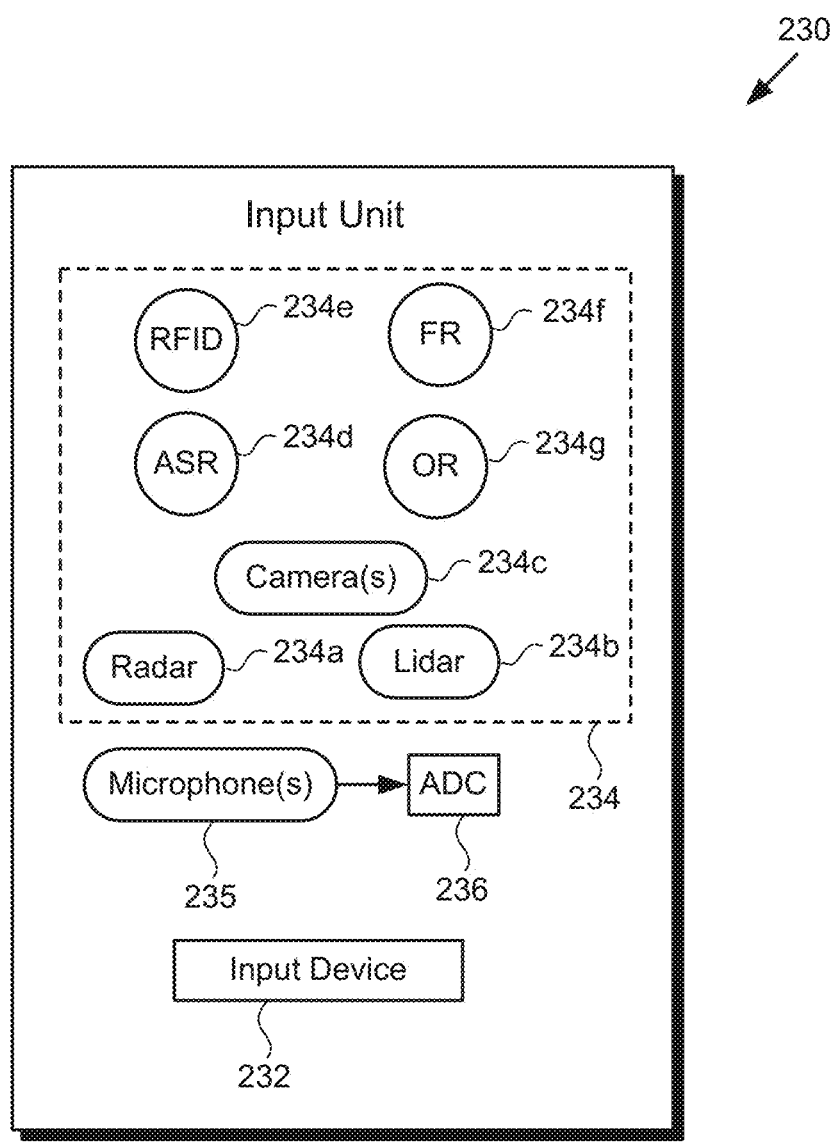
FIG. 2C shows a more detailed diagram of an input unit suitable for use as a component of the system shown in FIG. 1, according to one implementation.

FIG. 2C shows a more detailed diagram of input unit 230 suitable for use as a component of system 100, in FIG. 1, according to one implementation. As shown in FIG. 2C, input unit 230 may include input device 232, such as a keyboard or touchscreen for example, as well as multiple sensors 234, one or more microphones 235 (hereinafter "microphone(s) 235"), and analog-to-digital converter (ADC) 236. As further shown in FIG. 2C, sensors 234 of input unit 230 may include one or more of radio detection and ranging (radar) detector 234a, laser imaging, detection, and ranging (lidar) detector 234b, one or more cameras 234c (hereinafter "camera(s) 234c"), automatic speech recognition (ASR) sensor 234d, radio-frequency identification (RFID) sensor 234e, facial recognition (FR) sensor 234f, and object recognition (OR) sensor 234g. Input unit 230 corresponds in general to input unit 130, in FIG. 1. Thus, input unit 130 may share any of the characteristics attributed to input unit 230 by the present disclosure, and vice versa.

It is noted that the specific sensors shown to be included among sensors 234 of input unit 130/230 are merely exemplary, and in other implementations, sensors 234 of input unit 130/230 may include more, or fewer, sensors than radar detector 234a, lidar detector 234b, camera(s) 234c, ASR sensor 234d, RFID sensor 234e, FR sensor 234f, and OR sensor 234g. For example, in addition to, or as alternatives to the specific sensors shown in FIG. 2C, input unit 130/230 may include sensors for detecting one or more of ambient light, temperature, atmospheric pressure, to name a few.

Figure 2D:
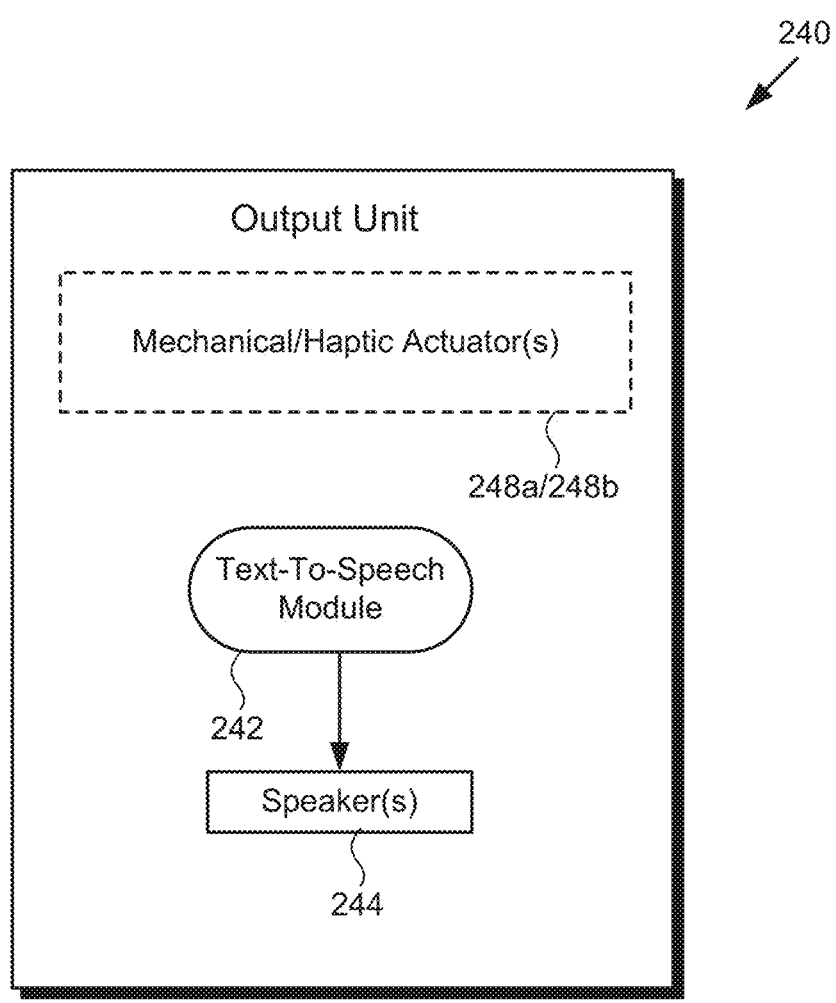
FIG. 2D shows a more detailed diagram of an output unit suitable for use as a component of the system shown in FIG. 1, according to one implementation.

FIG. 2D shows a more detailed diagram of output unit 240 suitable for use as a component of system 100, in FIG. 1, according to one implementation. As shown in FIG. 2D, output unit 240 may include one or more of Text-To-Speech (TTS) module 242 in combination with one or more audio speakers 244 (hereinafter "speaker(s) 244"), As further shown in FIG. 2D, in some implementations, output unit 240 may include one or more mechanical actuators 248a (hereinafter "mechanical actuator(s) 248a"), one or more haptic actuators 248b (hereinafter "haptic actuator(s) 248b"), or a combination of mechanical actuators) 248a and haptic actuators(s) 248b. It is further noted that, when included as a component or components of output unit 240, mechanical actuator(s) 248a may be used to produce facial expressions by automaton 101, to articulate one or more limbs or joints of automaton 101, or both. Output unit 240 corresponds in general to output unit 140, in FIG. 1. Thus, output unit 140 may share any of the characteristics attributed to output unit 240 by the present disclosure, and vice versa.

It is noted that the specific features shown to be included in output unit 140/240 are merely exemplary, and in other implementations, output unit 140/240 may include more, or fewer, features than TTS module 242, speaker(s) 244, mechanical actuator(s) 248a, and haptic actuator(s) 248b.

Figure 3A:
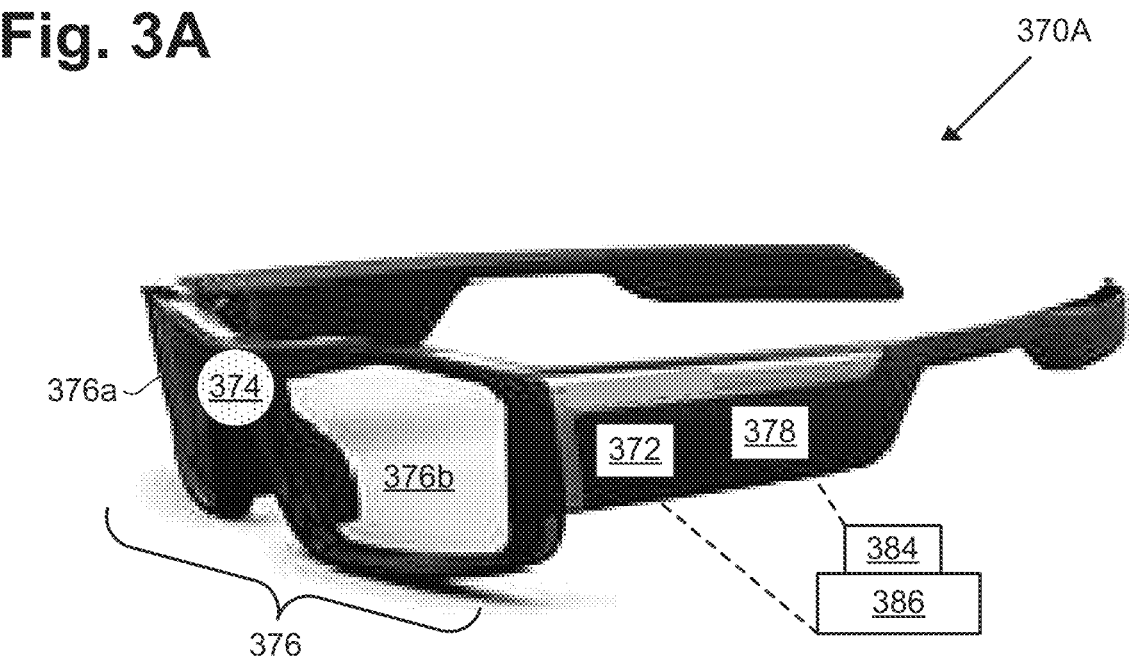
FIG. 3A shows an exemplary AR headset suitable for use as a component of the system shown in FIG. 1, according to one implementation.
Figure 3B:
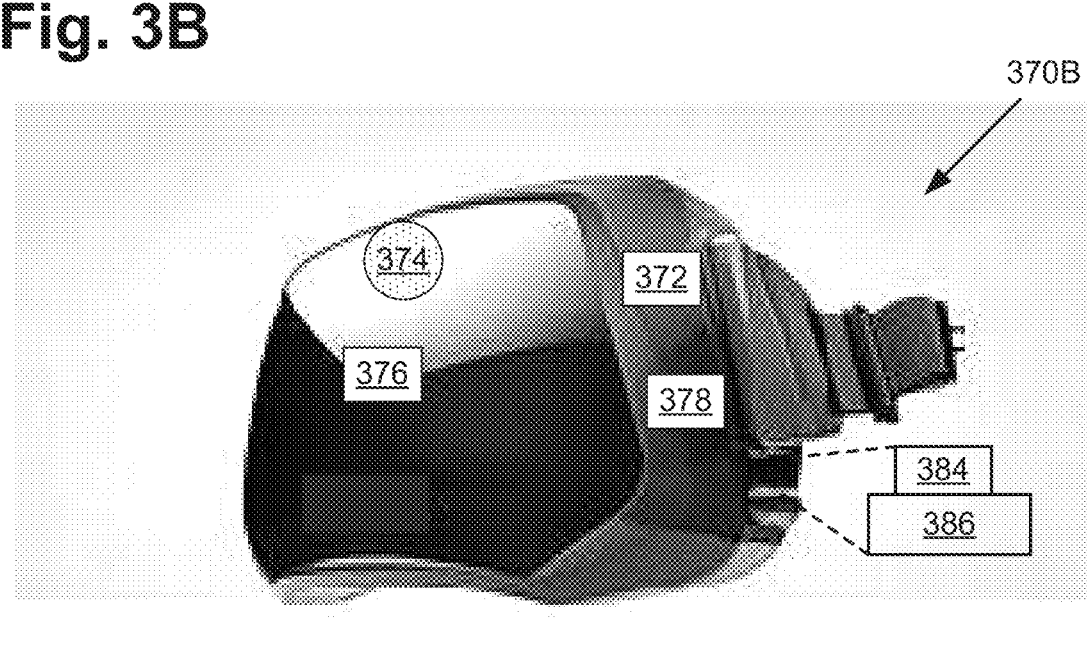
FIG. 3B shows an exemplary AR headset suitable for use as a component of the system shown in FIG. 1, according to another implementation.

Referring to FIGS. 3A and 3B, those figures show specific exemplary implementations of an AR headset suitable for use as part of system 100, in FIG. 1. As shown by FIGS. 3A and 3B, respective AR headsets 370A and 370B can take different forms. For example, and as shown by FIG. 3A, AR headset 370A may be implemented as AR glasses. As further shown by FIG. 3B, in some implementations, AR headset 370B may take the form of AR goggles. Moreover, in other implementations, an AR headset may take the form of any other type of wearable AR viewer.

Each of AR headsets 370A and 370B may include transceiver 372, camera 374, and display 376 under the control of processing hardware 384. In addition, each of AR headsets 370A and 370B may include memory 386 implemented as a computer-readable non-transitory storage medium, and may further include one or more position/location sensors 378 (hereinafter "P/L sensor(s) 378"). Either of AR headsets 370A and 370B can correspond in general to either or both of AR headsets 170a and 170b, in FIG. 1. Thus, AR headsets 170a and 170b may share any of the characteristics attributed to either of AR headsets 370A and 370B by the present disclosure, and vice versa. That is to say, although not shown in FIG. 1, AR headsets 170a and 170b may include features corresponding respectively to transceiver 372, camera 374, display 376, processing hardware 384, and memory 386, and may further include a feature or features corresponding to P/L sensor(s) 378.

Transceiver 372 may be implemented as a wireless communication unit enabling AR headsets 170a/170b/370A/370B to exchange data with system 100, in FIG. 1. For example, transceiver 372 may be implemented as a 4G transceiver, or as a 5G wireless transceiver. In addition, or alternatively, transceiver 372 may be configured for communications using one or more of WiFi, Bluetooth, ZigBee, and 60 GHz wireless communications methods.

Camera 374 may include one or more still image camera (s), video camera(s), or both. Moreover, in some implementations, camera 374 may correspond to an array of still image or video cameras configured to generate a panoramic or other composite image.

As shown in FIGS. 3A and 3B, display 376 may take the form of a single display screen, i.e., see FIG. 3B, or multiple display screens, i.e., display screens 376a and 376b in FIG. 3A. Display 376 including one or more display screens may be implemented as a liquid crystal display (LCD), a light-emitting diode (LED) display, an organic light-emitting diode (OLED) display, a quantum dot (QD) display, or any other suitable display screen that performs a physical transformation of signals to light.

P/L sensor(s) 378 may include one or more accelerometers, one or more gyroscopes, a Global Positioning System (GPS) receiver, a magnetometer, or any combination of such features, for example. In some implementations, sensor(s) 378 may be implemented as an inertial measurement unit (IMU).

It is emphasized that although FIGS. 3A and 3B show implementations of AR headsets 170a/170b/370A/370B that include transceiver 372, camera 374, and display 376 under the control of processing hardware 384, as well as memory 386 and P/L sensor(s) 378, those implementations are merely exemplary. In some use cases it may be advantageous or desirable for AR headset 170a/170b/370A/370B to be implemented simply as a display, such as display 376, while omitting the other features shown in FIGS. 3A and 3B. In those implementations, the data processing and location sensing functionality attributed to AR headsets 170a/170b/ 370A/370B herein may be performed by computing platform 102, which, in various implementations may have a wired connection to one or more of AR headsets 170a/170b/ 370A/370B.

Figure 4:
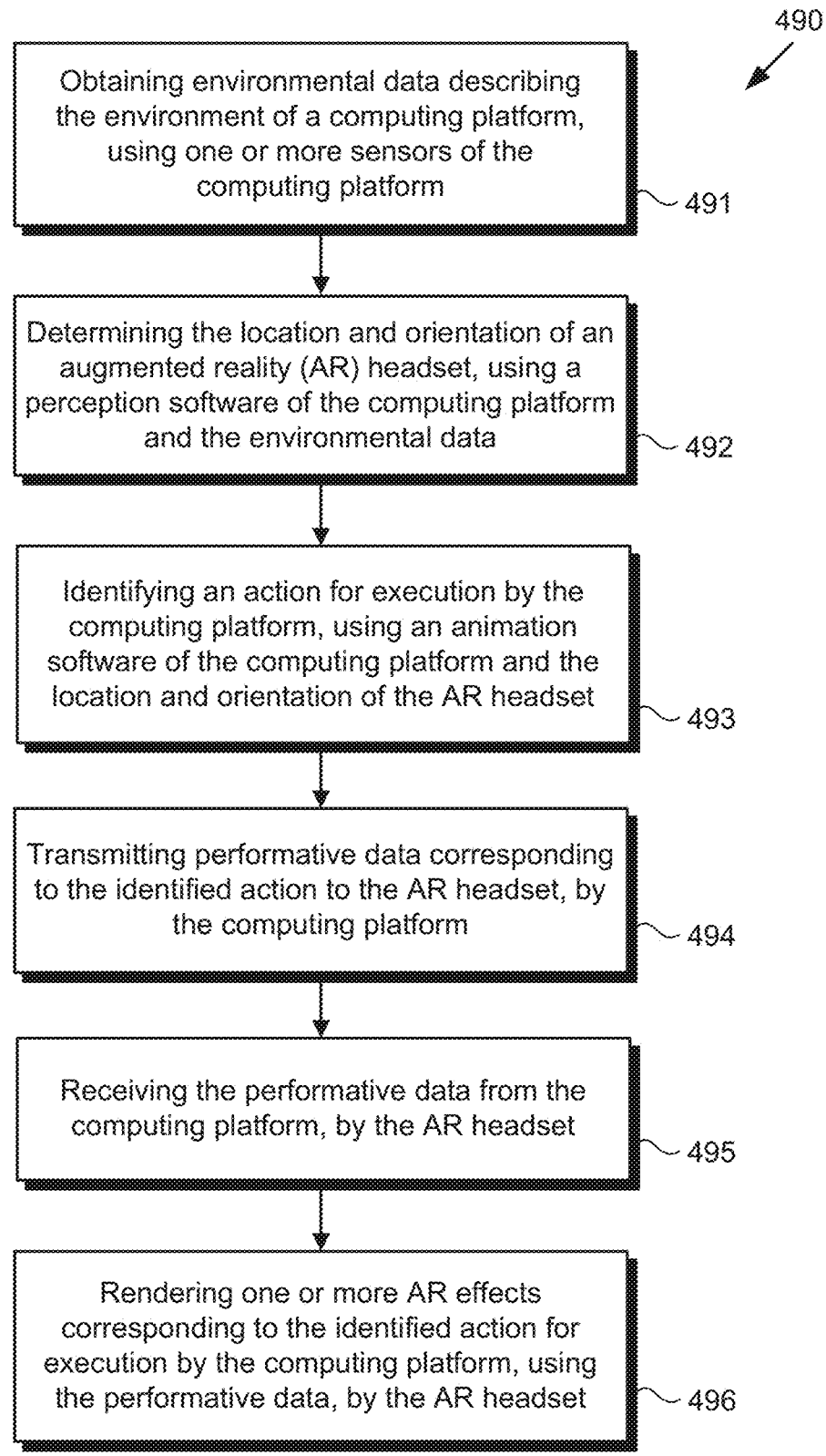
FIG. 4 shows a flowchart presenting an exemplary method for use by a system to provide AR enhanced interactive robotic animation, according to one implementation.

The functionality of system 100 including perception software 110/210 and animation software 120/220 will be further described by reference to FIG. 4. FIG. 4 shows flowchart 490 presenting an exemplary method for use by system 100 to provide AR enhanced interactive robotic animation, according to one implementation. With respect to the method outlined in FIG. 4, it is noted that certain details and features have been left out of flowchart 490 in order not to obscure the discussion of the inventive features in the present application.

Referring to FIG. 4, with further reference to FIGS. 1, 2A, and 2C, flowchart 490 may begin with obtaining, by computing platform 102, environmental data 156/256 describing the environment of computing platform 102, using one or more sensors 234 under the control of processing hardware 104 (action 491). Environmental data 156/256 may include one or more of still or video camera images captured by camera(s) 234c, radar or lidar data, or data produced by any of microphone(s) 235, ASR sensor 234d, RFID sensor 234e, FR sensor 234f, and OR sensor 234g. For example, environmental data 156/256 may describe the size of the room or other venue in which system 100 is located, the locations, shapes, and sizes of other objects in the vicinity of system 100, the locations and postures of human beings that are present, as well as the locations and intensities of light sources and audio sources.

Action 491 may be performed by perception software 110/210, executed by processing hardware 104 of system 100. It is noted that in implementations in which environmental data 156/256 includes audio data obtained by microphone(s) 235, that audio data may further include microphone metadata describing the angle of arrival of sound at microphone(s) 235, as well as the presence of background noise in the vicinity of computing platform 102.

Referring to FIGS. 3A and 3B in combination with FIGS. 1 and 2A, Flowchart 490 further includes determining, by computing platform 102 using processing hardware 104, the location and orientation of one or more of AR headsets 170a/170b/370A/370B, using perception software 110/210, and environmental data 156/256 (action 492). By way of example, action 492 may be performed by perception software 110/210, executed by processing hardware 104 of system 100, and using 2D keypoint estimation module 212, depth detection module 214, depth and keypoint blending module 216, and tracking and environmental modeling module 218 to process environmental data 156/256.

In implementations in which computing platform 102 is included in automaton 101, programming parameters 266 may govern how automaton 101 appears to human users 152a and 152b interacting with automaton 101, based, for example, on how automaton 101 perceives the human users and the environment, as described above by reference to FIG. 2B. It is noted that, in some implementations, programming parameter(s) 262 specifying how tracking and environmental modeling module 218 is to use environmental data 156/256, the output of depth and keypoint blending module 216, or both, to produce AR headset location and orientation data 160/260, as described above by reference to FIG. 2A. Programming parameter(s) 262 may be user specified programming parameters selected by a system user, such as an administrator of system 100. Alternatively, in some implementations, programming parameter(s) 262 may be learned by optional ML model-based perception parameterization module 258.

Referring to FIGS. 1 and 2B in combination, flowchart 490 further includes identifying, by computing platform 102 using processing hardware 104, an action for execution by computing platform 102, using animation software 120/220 and the location and orientation of one or more of AR headsets 170a/170b/370A/370B described by AR headset location and orientation data 160/260 (action 493). Action 493 may be performed by animation software 120/220, executed by processing hardware 104 of system 100, and using one or more of planning and control modules 222.

In implementations in which computing platform 102 is included in automaton 101, programming parameters 266 may determine the style of an action to be executed using automaton 101, such as the way automaton 101 moves, the speed of it motions or the cadence of its speech, how much it blinks or uses certain facial expressions, and so forth. It is noted that, in some implementations, programming parameter(s) 266 specifying how one or more of planning and control modules 222 are to process AR headset location and orientation data 160/260 to perform action 493 may be user specified programming parameters selected by a system user, such as an administrator of system 100. Alternatively, in some implementations, programming parameter(s) 266 may be learned by optional ML model-based animation parameterization module 264. Thus, in some implementations, computing platform 102 can advantageously learn its own parameters for controlling behavior.

As noted above by reference to FIG. 2D, an action for execution by computing platform 102, such as the action identified in action 493, may take a variety of forms. For example, and as further noted above, such an action may include speech, a non-verbal utterance, a glance, eye movement or other facial expression, posture, or partial or whole body movement. By way of example, in implementations in which computing platform 102 is included in automaton 101 having one or more joints, the identified action may include articulation of at least one of the one or more joints. Alternatively, in implementations in which computing platform 102 is included in automaton 101 in the form of a self-propelled vehicle, the identified action may be one or more of acceleration, slowing, turning, or stopping of the self-propelled vehicle.

Flowchart 490 further includes transmitting, by computing platform 102 to one or more of AR headsets 170*a*/170*b*/370A/370B, performative data 168/268 corresponding to the identified action for execution by computing platform 102 (action 494). As shown in FIG. 2B, performative data 168/268 may be generated by animation software 120/220, executed by processing hardware 104 of computing platform 102. Transmittal of performative data 168/268 to one or more of AR headsets 170*a*/170*b*/370A/370B in action 494 may be performed using transceiver 138, under the control of processing hardware 104.

Flowchart 490 further includes receiving, by one or more of AR headsets 170*a*/170*b*/370A/370B from computing platform 102, performative data 168/268 (action 495). Action 495 may be performed by one or more of AR headsets 170*a*/170*b*/370A/370B, using processing hardware 384 and transceiver 372.

Flowchart 490 further includes rendering, by one or more of AR headsets 170*a*/170*b*/370A/370B, one or more AR effects (hereinafter "AR effect(s)") corresponding to the action for execution by computing platform 102 identified in action 493, using performative data 168/268 (action 496). The AR effect(s) rendered in action 496 complement the action identified for execution by computing platform 102 from the respective perspectives of one or more human users of AR headsets 170*a*/170*b*/370A/370B. For example, in implementations in which computing platform 102 is included in automaton 101 in the form of a humanoid robot or toy, or a non-humanoid robotic character or toy, the AR effect(s) rendered in action 496 may include a skin or other visual effects for automaton 101. It is noted that as defined for the purposes of the present application, the term "skin" as applied to automaton 101 refers to the visible surface texture and color of automaton 101, as well as to distinctive facial and morphological features of the character persona assumed by automaton 101.

Moreover, in some implementations, such a skin may be personalized for each user of one or more AR headsets 170*a*/170*b*/370A/370B. That is to say in some implementations, human user 152*a* may utilize AR headset 170*a* to observe automaton 101 having the skin of a particular character persona, while human user 152*b* may utilize AR headset 170*b* to observe automaton 101 having a different skin of a different character. Alternatively, or in addition, in some implementations human users 152*a* and 152*b* may utilize respective AR headsets 170*a* and 170*b* to observe automaton 101 as the same character, but the character observed by human user 152*a* may be of a different color, be wearing a different costume, or be depicted with different accessories than the character observed by human user 152*b*.

As another example, in implementations in which computing platform 102 is included in automaton 101 in the form of a self-propelled vehicle, the AR effect(s) rendered in action 496 may provide a head-up display (HUD) depicting aspects, such as gauges and controls of a self-driving car, or depicting interactive or special effects provided during a theme park ride.

In some implementations, as shown in FIG. 1, memory 106 of computing platform 102 stores AR effects generator 108. In some of those implementations, computing platform 102 may be configured to generate the AR effect(s) corresponding to the identified action for execution by computing platform 102, using processing hardware 104, AR effects generator 108, and the identified action. In those implementations, performative data 168 transmitted to one or more of AR headsets 170*a*/170*b*/370A/370B may include the AR effect(s) generated by computing platform 102.

However, in other implementations, AR effects generator 108 may be resident on one or more of AR headsets 170*a*/170*b*/370A/370B. Referring to FIGS. 1, 3A, and 3B, in those implementations, one or more of AR headsets 170*a*/170*b*/1370A/370B may be configured to generate the AR effect(s) corresponding to the identified action for execution by computing platform 102, using processing hardware 384, AR effects generator 108, and performative data 168, before rendering the AR effect(s) on display 376. With respect to the method outlined by flowchart 490, it is emphasized that, in some implementations, actions 491 through 496 may be performed in an automated process from which human involvement may be omitted.

In some implementations, system 100 may omit sensors 234, perception software 110/210, and one or more AR headsets 170*a*/170*b*/370A/370B, but may include VR effects generator 154 communicatively coupled to computing platform 102. In those implementations, computing platform 102 may be configured to receive VR data describing VR environmental features from VR effects generator 154, using processing hardware 104, and to identify an action for execution by computing platform 102, using processing hardware 104, animation software 120/220, and the VR data. Moreover, in those implementations, computing platform 102 may then execute the identified action using processing hardware 104.

In some implementations, programming parameter(s) 266 specifying how one or more of planning and control modules 222 of animation software 110/210 are to process the VR data received from VR effects generator 154 may be user specified programming parameters selected by a system user, such as an administrator of system 100. Alternatively, in some implementations, programming parameter(s) 266 may be learned by optional ML model-based animation parameterization module 264.

It other implementations, system 100 may omit AR headsets 170a/170b/370A/370B, but may include sensors 234, perception software 110/210, and animation software 120/220, as well as VR effects generator 154 communicatively coupled to computing platform 102. In those implementations, computing platform 102 may be configured to receive VR data describing VR environmental features from VR effects generator 154, using processing hardware 104, and to obtain real-world environmental data describing the real-world environment of computing platform 102, using perception software 110/210, executed by processing hardware 104, and one or more of sensors 234. Processing hardware 104 may then execute animation software 120/220 to identify an action for execution by computing platform 102, using the VR data, and execute the identified action. Examples of such use cases include implementations in which automaton 101 functions as a mixed reality robot or toy, which may be configured to be a companion device for an adult or child, for instance.

In some implementations, programming parameter(s) 262 specifying how perception software 110/210 is to process the VR data received from VR effects generator 154 may be user specified programming parameters selected by a system user, such as an administrator of system 100. Alternatively, in some implementations, programming parameter(s) 262 may be learned by optional ML model-based perception parameterization module 258. Thus, in various implementations, one or both of perception software 110/210 or animation software 120/220 may include one or more programming parameters that are selected by a system user or learned by a machine-learning model-based parameterization module of respective perception software 110/210 or animation software 120/220. Consequently, in some implementations, computing platform 102 can advantageously learn its own parameters for controlling behavior.

Figure 5:
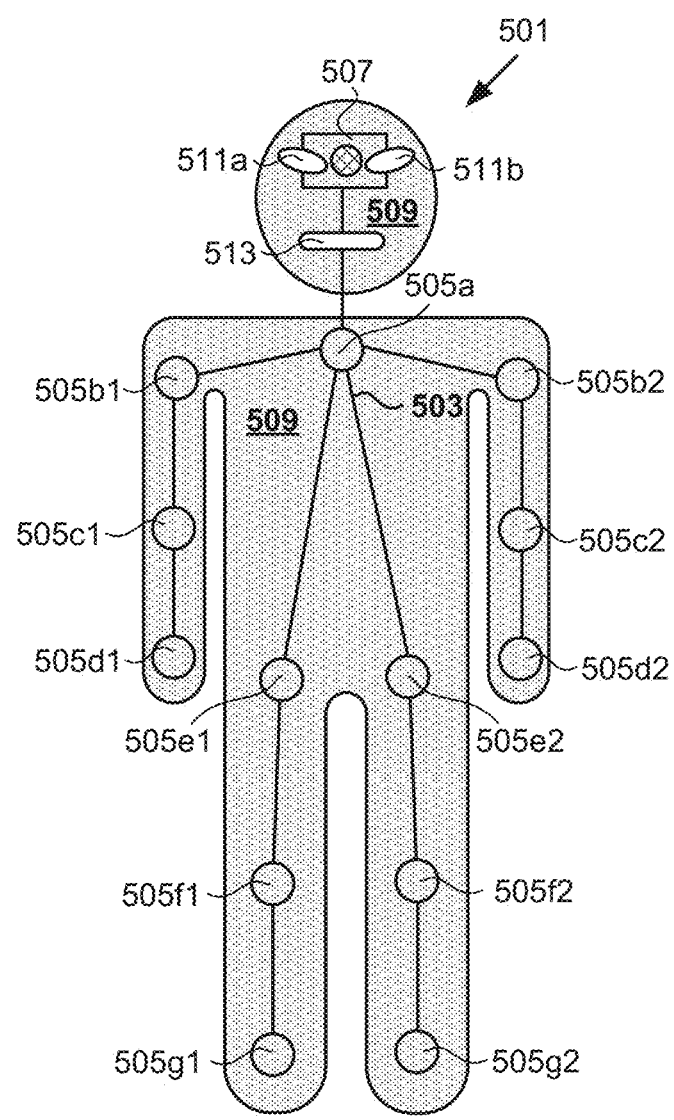
FIG. 5 shows an exemplary system for providing AR enhanced interactive robotic animation, in the form of an automaton, according to one implementation.

Referring to FIG. 5, FIG. 5 shows an exemplary system for providing AR enhanced interactive robotic animation, in the form of automaton 501, according to one implementation. As shown in FIG. 5, automaton 501 has skeletal structure 503 having multiple joints including neck joint 505a, shoulder joints 505b1 and 505b2 elbow joints 505c1 and 505c2, wrist joints 505d1 and 505d2, hip joints 505e1 and 505e2, knee joints 505f1 and 505f2, and ankle joints 505g1 and 505g2. In addition, automaton 501 includes camera 507 that can be aimed, i.e., turned laterally and deflected vertically, using neck joint 505a. As further shown in FIG. 5, automaton 501 is overlaid by an AR effect in the form of skin 509 that covers or clothes skeletal structure 503 and camera 507, and provides eyes 511a and 511b and mouth 513 of automaton 501.

It is noted that automaton 501 corresponds in general to automaton 101, in FIG. 1, and those corresponding features may share any of the characteristics attributed to either corresponding feature by the present application. Thus, like automaton 101, automaton 501 may include computing platform 102 having any or all of the features described by reference to FIGS. 1, 2A, 2B, 2C, and 2D. Moreover, like automaton 501 in FIG. 5, automaton 101 may include camera 507, as well as skeletal structure 503 having features corresponding to one or more of neck joint 505a, shoulder joints 505b1 and 505b2 elbow joints 505c1 and 505c2, wrist joints 505d1 and 505d2, hip joints 505e1 and 505e2 knee joints 505f1 and 505f2, and ankle joints 505g1 and 505g2. In addition, and also like automaton 501, automaton 101 may appear to be covered by an AR effect corresponding to skin 509.

In various implementations, as discussed above by reference to FIG. 2D, mechanical actuator(s) 248a of output unit 140/240 may be used to produce facial expressions by automaton 101/501, using mouth 513, eyes 511a and 511b, or mouth 513 and eyes 511a and 511b. In addition, or alternatively, mechanical actuator(s) 248a of output unit 140/240 may be used to articulate one or more of neck joint 505a, shoulder joints 505b1 and 505b2, elbow joints 505c1 and 505c2, wrist joints 505d1 and 505d2, hip joints 505e1 and 505e2, knee joints 505f1 and 505f2, and ankle joints 505g1 and 505g2, to produce gestures or other movements by automaton 101/501.

Thus, as described above, the present application discloses systems and methods for providing AR enhanced interactive robotic animation. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   an automaton having a computing platform including a first processing hardware, at least one sensor, and a memory storing a perception software and an animation software; and
   an augmented reality (AR) headset including a second processing hardware;
   the computing platform configured to:
      obtain an environmental data, using the at least one sensor under the control of the first processing hardware;
      determine a location and an orientation of the AR headset, using the first processing hardware, the perception software, and the environmental data;
      identify a real-world action for execution by the computing platform, using the first processing hardware, the animation software, and the location and the orientation of the AR headset;
      execute the identified real-world action, wherein the identified real-world action comprises a physical movement by the automaton; and
      transmit, to the AR headset, a performative data corresponding to the identified real-world action, using the first processing hardware;
   the AR headset configured to:
      receive, from the computing platform, the performative data, using the second processing hardware; and
      render at least one AR effect corresponding to the identified real-world action, using the second processing hardware and the performative data.

2. The system of claim 1, wherein the AR headset further comprises an AR effects generator, wherein before being configured to render the at least one AR effect, the AR headset is further configured to:

generate the at least one AR effect corresponding to the identified real-world action, using the second processing hardware, the AR effects generator, and the performative data.

3. The system of claim 1, wherein the memory of the computing platform further stores an AR effects generator, and wherein the computing platform is further configured to:
generate the at least one AR effect corresponding to the identified real-world action, using the first processing hardware, the AR effects generator, and the identified real-world action;
wherein the performative data transmitted to the AR headset includes the at least one AR effect generated by the computing platform.

4. The system of claim 1, wherein the at least one AR effect comprises a skin for the automaton.

5. The system of claim 1, wherein the automaton is one of a robot or a toy.

6. The system of claim 5, wherein the automaton includes at least one joint, and wherein the identified real-world action comprises an articulation of the at least one joint.

7. The system of claim 1, wherein the automaton comprises a self-propelled vehicle.

8. The system of claim 1, wherein at least one of the perception software or the animation software includes one or more programming parameters that are learned by a machine-learning model-based parameterization module of the at least one of the perception software or the animation software.

9. A method for use by a system comprising an automaton having a computing platform including a first processing hardware, at least one sensor, and a memory storing a perception software and an animation software, the system further comprising an augmented reality (AR) headset including a second processing hardware, the method comprising:
obtaining an environmental data, by the computing platform using the at least one sensor under the control of the first processing hardware;
determining a location and an orientation of the AR headset, by the computing platform using the first processing hardware, the perception software, and the environmental data;
identifying a real-world action for execution by the computing platform, by the computing platform using the first processing hardware, the animation software, and the location and the orientation of the AR headset;
executing the identified real-world action, by the computing platform using the first processing hardware, wherein the identified real-world action comprises a physical movement by the automaton; and
transmitting, to the AR headset, a performative data corresponding to the identified real-world action, by the computing platform using the first processing hardware;
receiving from the computing platform the performative data, by the AR headset using the second processing hardware; and
rendering at least one AR effect corresponding to the identified real-world action, by the AR headset using the second processing hardware and the performative data.

10. The method of claim 9, wherein the AR headset further comprises an AR effects generator, the method further comprising:
before rendering the at least one AR effect:
generating the at least one AR effect corresponding to the identified real-world action, by the AR headset using the second processing hardware.

11. The method of claim 9, wherein the memory of the computing platform further stores an AR effects generator, the method further comprising:
before transmitting the performative data to the AR headset:
generating the at least one AR effect corresponding to the identified real-world action, by the computing platform using the first processing hardware;
wherein the performative data includes the at least one AR effect generated by the computing platform.

12. The method of claim 9, wherein the at least one AR effect comprises a skin for the automaton.

13. The method of claim 9, wherein the automaton is one of a robot or a toy.

14. The method of claim 13, wherein the automaton includes at least one joint, and wherein the identified real-world action comprises an articulation of the at least one joint.

15. The method of claim 9, wherein the automaton comprises a self-propelled vehicle.

16. The method of claim 9, wherein at least one of the perception software or the animation software includes one or more programming parameters that are learned by a machine-learning model-based parameterization module of the at least one of the perception software or the animation software.

17. An automaton for providing augmented reality (AR) effects to an AR headset, the automaton comprising:
a computing platform including a processing hardware and a memory storing an animation software; and
the computing platform configured to:
obtain environmental data describing a plurality of environmental features, using the processing hardware;
determine a location of the AR headset, using the processing hardware;
identify a real-world action for execution by the computing platform, using the processing hardware, the animation software, the environmental data and the location;
execute the identified real-world action, using the processing hardware, wherein the identified real-world action comprises a physical movement by the automaton; and
transmit, to the AR headset, a performative data corresponding to the identified real-world action, using the processing hardware.

18. The automaton of claim 17, wherein the animation software includes one or more programming parameters that are learned by a machine-learning model-based parameterization module of the animation software.

19. The automaton of claim 17, wherein the animation software includes one or more programming parameters that are learned by a machine-learning model-based parameterization module of the animation software.

* * * * *